United States Patent
Hammerstone et al.

(10) Patent No.: US 10,157,443 B1
(45) Date of Patent: Dec. 18, 2018

(54) DEFERRED BATCHING OF INCREMENTAL CONSTANT LOADS

(71) Applicant: QUALCOMM Incorporated, San Diego, CA (US)

(72) Inventors: Richard Hammerstone, Tyngsboro, MA (US); Thomas Edwin Frisinger, Shrewsbury, MA (US); Andrew Evan Gruber, Arlington, MA (US); Nigel Terence Poole, West Newton, MA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/662,933

(22) Filed: Jul. 28, 2017

(51) Int. Cl.
  *G06T 15/00* (2011.01)
  *G06T 1/20* (2006.01)
  *G06T 1/60* (2006.01)

(52) U.S. Cl.
  CPC .................. *G06T 1/20* (2013.01); *G06T 1/60* (2013.01); *G06T 15/005* (2013.01)

(58) Field of Classification Search
  None
  See application file for complete search history.

(56) References Cited

U.S. PATENT DOCUMENTS

| | | | |
|---|---|---|---|
| 2012/0069033 A1 | 3/2012 | Jiao et al. | |
| 2013/0106853 A1* | 5/2013 | Lawrence et al. | G06T 15/00 345/423 |
| 2013/0293544 A1* | 11/2013 | Schreyer et al. | G06T 15/005 |
| 2016/0171751 A1 | 6/2016 | Doyle et al. | |
| 2016/0232645 A1* | 8/2016 | Wang | G06T 1/60 |
| 2016/0350966 A1 | 12/2016 | Nilsson et al. | |
| 2016/0371873 A1 | 12/2016 | Mantor et al. | |

* cited by examiner

*Primary Examiner* — Martin Mushambo
(74) *Attorney, Agent, or Firm* — Shumaker & Sieffert, P.A.

(57) ABSTRACT

The techniques of this disclosure include deferred batching of incremental constant loads. Graphics APIs include the ability to use lightweight constants for use by shaders. A buffer is allocated by a graphics processing unit (GPU) driver that contains a snapshot of the current lightweight constants. This may provide a complete set of state to serve as a starting point. From then on updates to the lightweight constants may be appended to this buffer in an incremental fashion by inserting the update and increasing the size of the buffer by a command processor on a graphics processing unit (GPU). The incremental nature of the updates may be captured, but removes the need for issuing them on every draw call and instead the incremental updates may be batch processed when a live draw call is encountered.

28 Claims, 4 Drawing Sheets

US 10,157,443 B1

DEFERRED BATCHING OF INCREMENTAL CONSTANT LOADS

TECHNICAL FIELD

The present disclosure relates to graphics processing

BACKGROUND

Computing devices often utilize a graphics processing unit (GPU) to accelerate the rendering of graphics data for display. Such computing devices may include, e.g., computer workstations, mobile phones such as so-called smartphones, embedded systems, personal computers, tablet computers, and video game consoles. GPUs typically execute a graphics processing pipeline that includes a plurality of processing stages which operate together to execute graphics processing commands. A host central processing unit (CPU) may control the operation of the GPU by issuing one or more graphics processing commands to the GPU, via e.g., an application programming interface (API). Modern day CPUs are typically capable of concurrently executing multiple applications, each of which may need to utilize the GPU during execution.

SUMMARY

The techniques of this disclosure include deferred batching of incremental constant loads. Specifically, graphics APIs include lightweight constants (also known as push constants) for use by shaders. A buffer is allocated by a graphics driver on a central processing unit (CPU), where the buffer contains a snapshot of the current lightweight constants. The snapshot may provide a complete set of state to serve as a starting point. From then on updates to the lightweight constants may be appended to this buffer, by the graphics driver, in an incremental fashion by inserting the update and increasing the size of the buffer, without needing to perform the updates at the time an update command is received. This may effectively capture the incremental nature of the updates, but removes the need for issuing them on every draw call and instead the incremental updates may be batch processed when a live (e.g., visible) draw call is encountered. For example, processing time is not wasted on immediately performing the updates especially if the updates are for pixels that are ultimately not visible.

In one example of this disclosure, a method of operating a graphic processing unit (GPU) comprising: determining, during a binning operation, that a first command in a command buffer is configured to update one or more constant values in a state buffer, the state buffer comprising a copy of a current constant state, appending one or more constant updates from the first command to the state buffer based on the first command without updating the one or more constant values until a draw operation, determining that a second command in the command buffer is configured to perform the draw operation, determining whether the second command is a visible draw operation, and when the second command is the visible draw operation, batch processing the one or more constant updates in the state buffer.

In another example, an apparatus for processing data, the apparatus comprising: a graphics processing unit (GPU), the GPU comprising command buffer and a state buffer, and a command processor, wherein the command processor is configured to: determine, during a binning operation, that a first command in the command buffer is configured to update one or more constant values in the state buffer, the state buffer comprising a copy of a current constant state, append one or more constant updates from the first command to the state buffer based on the first command without updating the one or more constant values until a draw operation, determine that a second command in the command buffer is configured to perform the draw operation, determine whether the second command is a visible draw operation, and when the second command is the visible draw operation, batch process the one or more constant updates in the state buffer.

In another example, an apparatus configured to operate a graphic processing unit (GPU), the apparatus comprising: means for determining, during a binning operation, that a first command in a command buffer is configured to update one or more constant values in a state buffer, the state buffer comprising a copy of a current constant state, means for appending one or more constant updates from the first command to the state buffer based on the first command without updating the one or more constant values until a draw operation, means for determining that a second command in the command buffer is configured to perform the draw operation, means for determining whether the second command is a visible draw operation, and means for batch processing the one or more constant updates in the state buffer when the second command is the visible draw operation.

In another example, a non-transitory computer-readable storage medium including instructions stored thereon that, when executed, cause at least one processor to: determine, during a binning operation, that a first command in the command buffer is configured to update one or more constant values in the state buffer, the state buffer comprising a copy of a current constant state, append one or more constant updates from the first command to the state buffer based on the first command without updating the one or more constant values until a draw operation, determine that a second command in the command buffer is configured to perform the draw operation, determine whether the second command is a visible draw operation, and when the second command is the visible draw operation, batch process the one or more constant updates in the state buffer.

The details of one or more aspects of the present disclosure are set forth in the accompanying drawings and the description below. Other features, objects, and advantages of the present disclosure will be apparent from the description and drawings, and from the claims.

DETAILED DESCRIPTION

Figure 1:
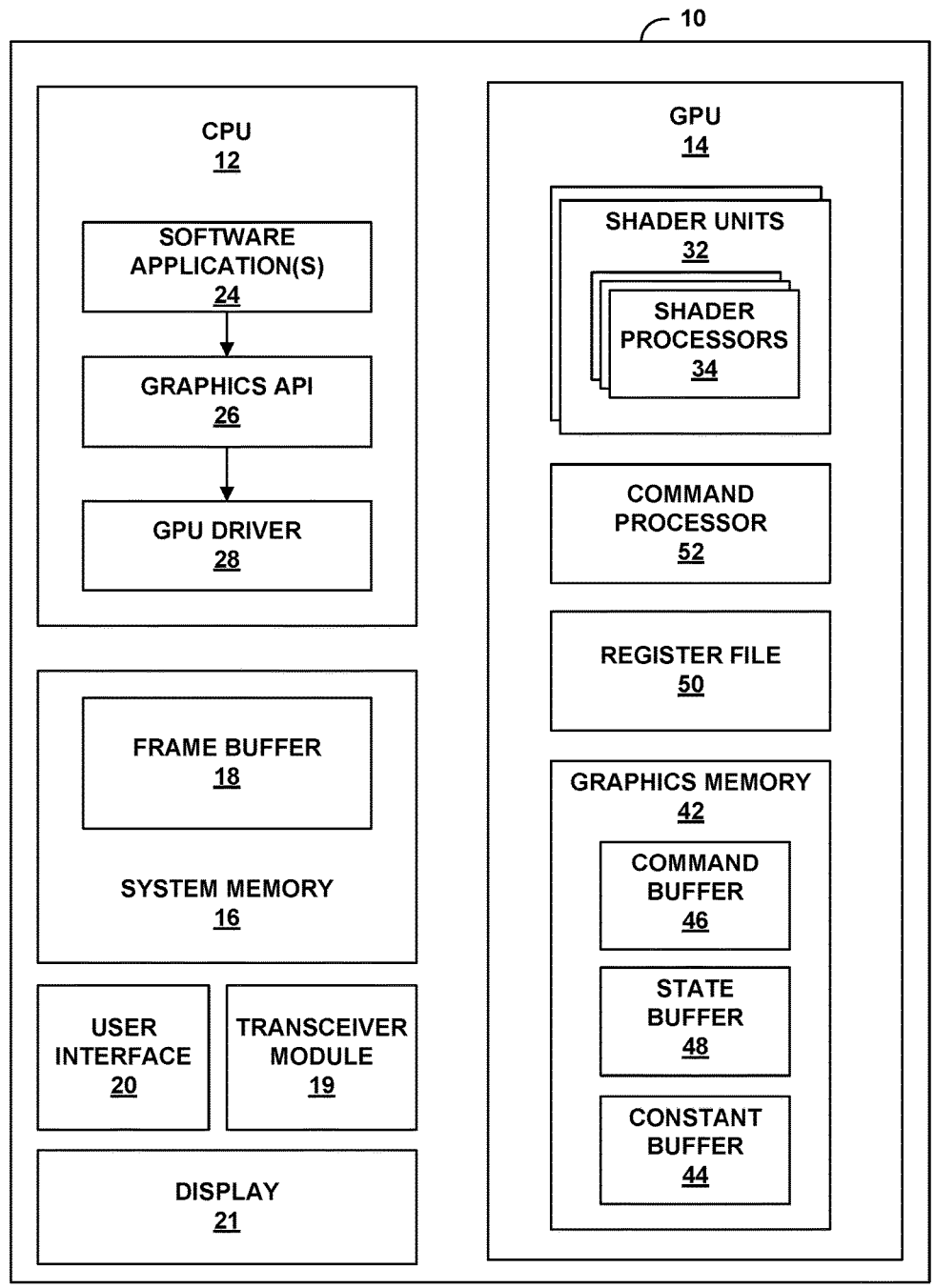
FIG. 1 is a block diagram illustrating an example computing device that may be configured to implement one or more aspects of this disclosure.

Graphics application programming interfaces (APIs), such as Khronos Group™ Vulkan®, include lightweight constants for use by shaders. A shader is a program that executes on a graphics processing unit (GPU) and causes the GPU to perform various operations. Lightweight constants, also called push constants, may include constants that are mapped directly to registers without overhead to a GPU driver, executing on a central processing unit (CPU) to write to these constants. These constants are accessible by shaders and include, in some examples, uniform values that are stored within the command buffer and may be accessed from the shaders similar to a single global uniform buffer.

When rendering graphics data, various graphics processing techniques perform graphics processing in two passes. A first pass is referred to as a binning pass, in which a GPU determines which primitives belong to which bin (also called a tile) and which primitives are visible. In a second pass, referred to as a rendering pass, the GPU renders each bin sequentially based on the determination of which primitives belong to which bin and the visibility of the primitives.

Lightweight constants may be designed to be incremental in nature and may be difficult and inefficient to use in a binning architecture because the stream of incremental changes may have to be executed for each bin, regardless of whether draws in the bin are visible (e.g., live) or not (e.g., dead). In a binning architecture, an image frame is divided into bins, and the GPU processes each bin. A live draw in a bin being visible means a draw call to render pixels that are visible, and a dead draw in a bin being not visible means a draw call to render pixel that are not visible.

The techniques of this disclosure include a graphics processing unit (GPU) that may group register and other state writes and load them to the hardware via an indirect pointer. In an exemplary binning architecture, this indirect pointer load may be deferred until a visible draw call is encountered in the command stream. Deferred batching of incremental constant loads may leverage this functionality to allow accumulation of incremental constant writes on top of a snapshot of the current lightweight constant state. A buffer may be allocated that contains a snapshot of the current lightweight constants. In one example, the graphics driver places all register write commands in a large command buffer. In another example, the graphics driver can allocate smaller, individual buffers that can be loaded with a subset of the register state (e.g., grouped by function). The graphics driver then places an indirect pointer to these smaller buffers in the main command buffer. When the Command Processor (CP) in the GPU hardware consumes the main command buffer, the CP stores these indirect pointers until a live draw call is encountered, at which point the register programming in them is executed. For dead draw calls, the only overhead is storing away the indirect pointers.

From then on, updates to the lightweight constants may be appended to this buffer in an incremental fashion by inserting the update and increasing the size of the buffer. This may effectively capture the incremental nature of the updates, but may remove the need for issuing them on every draw call: live, if the draw call will be visible, or dead, if the draw call will not be visible.

Techniques of the present disclosure may represent a significant advantage to alternatives, for example, capturing a snapshot of the entire lightweight constant state for each draw call or processing constant updates in an immediate fashion, where they will be executed for every draw, regardless whether a particular draw is visible or not as these techniques may incur unnecessary processing for draw calls that do not affect what is displayed.

FIG. 1 is a block diagram illustrating an example computing device 10 that may be configured to implement one or more aspects of this disclosure. Computing device 10 may be a computing device including but not limited to video devices, media players, set-top boxes, wireless handsets such as mobile telephones and so-called smartphones, personal digital assistants (PDAs), desktop computers, laptop computers, gaming consoles, video conferencing units, tablet computing devices, and the like.

In the example of FIG. 1, computing device 10 includes central processing unit (CPU) 12, GPU 14, and system memory 16. Computing device 10 also includes transceiver module 19, user interface 20, and display 21. It should be understood, however, that other examples of computing device 10 may include more, fewer, or an alternative arrangement of components than those shown.

For example, computing device 10 may include a speaker and a microphone, neither of which are shown in FIG. 1, to effectuate telephonic communications in examples where computing device 10 is a mobile wireless telephone, or a speaker where computing device 10 is a media player. Computing device 10 may also include a video camera. In another example, certain units such as transceiver module 19 or a display processor associated with display 21 may be part of the same integrated circuit (IC) as CPU 12 and/or GPU 14, may both be external to the IC or ICs that include CPU 12 and/or GPU 14, or may be formed in the IC that is external to the IC that includes CPU 12 and/or GPU 14.

CPU 12 may comprise a general-purpose or a special-purpose processor that controls operation of computing device 10. For example, CPU 12 may include one or more processors, such as one or more microprocessors, application specific integrated circuits (ASICs), field programmable gate arrays (FPGAs), digital signal processors (DSPs), or other equivalent integrated or discrete logic circuitry. As described in greater detail below, CPU 12 may issue one or more graphics rendering commands to GPU 14 to cause GPU 14 to render graphics data.

GPU 14 may include a programmable pipeline of processing components having a highly-parallel structure that provides efficient processing of complex graphic-related operations. GPU 14 may include one or more processors, such as one or more microprocessors, application specific integrated circuits (ASICs), field programmable gate arrays (FPGAs), digital signal processors (DSPs), or other equivalent integrated or discrete logic circuitry. GPU 14 may also include one or more processor cores, such that GPU 14 may be referred to as a multi-core processor. GPU 14 may, in some instances, be integrated into a motherboard of computing device 10. In other instances, GPU 14 may be present on a graphics card that is installed in a port in the motherboard of computing device 10 or may be otherwise incorporated within a peripheral device configured to interoperate with computing device 10.

GPU 14 may output rendered data to system memory 16, e.g., frame buffer 18 of system memory 16. System memory 16 may store an operating system (not shown) that controls the operation of components of computing device 10. System memory 16 may also be used by software or applications (as described below) executed by computing device 10 to store information during program execution. System memory 16 may include a computer-readable storage medium or computer-readable storage device. In some examples, system memory 16 may include one or more of a short-term memory or a long-term memory. System memory 16 may include, for example, random access memories (RAM), dynamic random access memories (DRAM), static random access memories (SRAM), cache memory, magnetic hard discs, optical discs, flash memories, or forms of electrically programmable memories (EPROM) or electrically erasable and programmable memories (EEPROM).

Frame buffer 18 stores destination pixels for GPU 14. Each destination pixel may be associated with a unique screen pixel location. In some examples, frame buffer 18 may store color components and a destination alpha value for each destination pixel. For example, frame buffer 18 may store Red, Green, Blue, Alpha (RGBA) components for each pixel where the "RGB" components correspond to color values and the "A" component corresponds to a destination alpha value (e.g., a transparency value that may be used in compositing, which may also be referred to as opacity). Although frame buffer 18 and system memory 16 are illustrated as being separate memory units, in other examples, frame buffer 18 may be part of system memory 16.

Transceiver module 19 may include circuitry to allow wireless or wired communication between computing device 10 and another device or a network. Transceiver module 19 may include modulators, demodulators, amplifiers and other such circuitry for wired or wireless communication.

User interface 20 may allow a user to provide input to computing device 10. Examples of user interface 20 include, but are not limited to, a trackball, a mouse, a keyboard, and other types of input devices. User interface 20 may also be a touch screen and may be incorporated as a part of display 21.

Display 21 may display image content generated by GPU 14, e.g., such as rendered graphics data from frame buffer 18. Display 21 may be a liquid crystal display (LCD), an organic light emitting diode display (OLED), a cathode ray tube (CRT) display, a plasma display, or another type of display device. Display 21 may include a display processor that retrieves images from system memory 16 and outputs values that cause the pixels of display 21 to illuminate to display the image.

In operation, CPU 12 may execute one or more software applications 24. Examples of software applications 24 include applications that utilizes the functionality of GPU 14. For example, software applications 24 may include a graphical user interface (GUI) application, an operating system, a portable mapping application, a computer-aided design program for engineering or artistic applications, a video game application, or another type of software application that uses 2D or 3D graphics.

Software applications 24 may include one or more drawing instructions that instruct GPU 14 to render a graphical user interface (GUI) and/or a graphics scene. For example, the drawing instructions may include instructions that define a set of one or more graphics primitives to be rendered by GPU 14. In some examples, the drawing instructions may, collectively, define all or part of a plurality of windowing surfaces used in a GUI. In additional examples, the drawing instructions may, collectively, define all or part of a graphics scene that includes one or more graphics objects within a model space or world space defined by the application.

Software applications 24 may use graphics application programming interface (API) 26 to invoke GPU driver 28. Example graphics APIs include a Khronos Group™ Vulkan® API, an Open Graphics Library (OpenGL®) API, an Open Graphics Library Embedded Systems (OpenGL ES) API, a Direct3D API, an X3D API, a RenderMan API, a WebGL API, an Open Computing Language (OpenCL™), RenderScript or any other heterogeneous computing APIs, or any other public or proprietary standard graphics or compute API. Graphics API 26 may support lightweight or push constants. Lightweight constants map directly to a hardware resource, and thus avoid the memory allocation and tracking required with a normal constant buffer. They include a bank of values writable via the API and accessible in shaders. Push constants allow the application to set values used in shaders without creating buffers or modifying and binding descriptor sets for each update. Lightweight constants may include floating point values. In other examples, lightweight constants include integer values.

GPU driver 28 may issue one or more commands to GPU 14 for rendering one or more graphics primitives into displayable graphics images. For example, software applications 24 may invoke GPU driver 28, via graphics API 26, to provide primitive definitions to GPU 14. In some instances, GPU driver 28 may provide primitive definitions to GPU 14 in the form of a list of drawing primitives, e.g., triangles, rectangles, triangle fans, triangle strips, etc. The primitive definitions may include vertex specifications that specify one or more vertices associated with the primitives to be rendered. The vertex specifications may include positional coordinates for each vertex and, in some instances, other attributes associated with the vertex, such as, e.g., color coordinates, normal vectors, and texture coordinates. The primitive definitions may also include primitive type information (e.g., triangle, rectangle, triangle fan, triangle strip, etc.), scaling information, rotation information, and the like. Hence, based on the instructions issued by software applications 24 to GPU driver 28, GPU driver 28 may formulate one or more commands that specify one or more operations for GPU 14 to perform in order to render the primitive.

In some examples, GPU driver 28 may include a compiler configured to compile the commands as one or more shader programs, and to download the compiled shader programs to GPU 14. The compiled shader programs may include one or more instructions that control the operation of shader units 32 within GPU 14. The shader programs may be written in a high-level shading language, such as, e.g., an OpenGL Shading Language (GLSL), a High-Level Shading Language (HLSL), a C for Graphics (Cg) shading language, an OpenCL C kernel, etc.

GPU 14 includes shader units 32 for executing the shader programs, and may perform a variety of shading operations for rendering graphics. For example, shader units 32 (also shader cores) may execute the shader programs to implement a variety of shader stages (which may collectively be referred to as a shader pipe) of a graphics processing pipeline. The shader programs (or simply shaders) may include vertex shader programs that may be executed by shader units 32 to perform the functions of a vertex shader stage, hull shader programs that may be executed by shader units 32 to perform the functions of a hull shader stage, domain shader programs that may be executed by shader units 32 to perform the functions of a domain shader stage, geometry shader programs that may be executed by shader units 32 to perform the functions of a geometry shader stage and/or pixel shader programs that may be executed by shader units 32 to perform the functions of a pixel shader.

In the example of FIG. 1, shader units 32 each have shader processors 34. Shader processors 34 may include a plurality of processing elements for operating on multiple vertices or pixels in a parallel manner. For example, shader processors 34 may each include one or more components for fetching and decoding operations, one or more arithmetic logic units (ALUs) for carrying out arithmetic calculations, one or more memories, caches, and registers.

GPU 14 includes command processor 52. Command processor 52 may fetch instructions from locations in system memory 16 identified by GPU driver 28 and store those instructions in command buffer 46. Command processor 52 may process the instructions found in command buffer 46.

GPU 14 includes graphics memory 42 which contains constant buffer 44, command buffer 46, state buffer 48. GPU 14 also includes register file 50. In some examples, command buffer 46 is located within system memory 16. Command buffer 46 may store commands to be processed by command processor 52 and executed by GPU 14 including at shader units 32, such as draw commands. GPU driver 28 stores commands in system memory 16. GPU driver 28 then instructions GPU 14 when to retrieve the commands, from where to get the commands, and when to execute the commands. GPU driver 28 may instruct GPU 14 to retrieve commands and store these commands in command buffer 46. State buffer 48 is comprised of commands to either write registers or write resources descriptors (used for textures, samplers, shaders, etc.). State buffer 48 contains commands to set the current state of the hardware (e.g., GPU 14). In some examples, state buffer 48 does not include commands that perform actions (e.g., draws, etc.). State buffer 48 may store a copy of the state of all or part of register file 50. The copy of the state of all or part of register file 50 may include sections corresponding to the lightweight constants stored in register file 50. Register file 50 may store one or more lightweight constants accessible by shader units 32.

GPU driver 28 may allocate memory in state buffer 48 for the initial snapshot of constant data and GPU driver 28 may allocate additional memory for updates. This additional memory may be allocated but remain unused. State buffer 48 may receive and store a copy of the state of lightweight constants in GPU 14, from register file 50, and may also store constant updates that have not been processed. For example, command processor 52 may determine that a command in command buffer 46 is configured to update one or more constant values. When this command, stored in command buffer 46, is encountered, e.g., by shader processors 34 of shader units 32, that alters the state of a lightweight constant, the size of used memory (as opposed to e.g., the physical size of the total allocation) in state buffer 48 may be increased by GPU driver 28 and the update may be appended to the state buffer 48 for later processing. When GPU driver 28 appends constants to state buffer 48, GPU driver 28 may increase the size of the valid data (by, e.g., the size of the constant update command(s)). At some point, the extra room may be all used up, and GPU driver 28 may create a new state buffer and begin the process again. Command processor 52 may determine that a command in command buffer 46 is a draw command. When the draw command is encountered, e.g., by shader processors 34 of shader units 32, a determination is made as to whether the command is live (e.g., visible) or dead (e.g., not visible). Command processor 52 may determine whether the command is live or dead by reading the visibility stream for the current bin.

In some examples, the scene to be drawn is broken up into multiple bins, and rendered one at a time in an on-chip memory buffer, e.g., in graphics memory 42, to save memory bandwidth. When drawing a scene, the GPU driver 28 sends the rendering commands to GPU 14 in multiple passes. The first pass is a "visibility" pass. GPU 14 does not draw the scene, but instead computes which draw commands and triangles are visible in each bin. This information is stored in a per-bin visibility stream in graphics memory 42. Once the visibility pass is complete, GPU driver 28 then sends the rendering commands again, one pass per bin. Command processor 52 reads the visibility stream for the current bin as it processes command buffer 46. Only the draw commands and triangles that are visible in the current bin are executed on each pass.

If the command is live, command processor 52 may process all or substantially all the deferred constant updates (in order of receiving them in the stack in state buffer 48). The processing of the updates may be performed one or more batches. Following processing of the constant updates, the updated constants may be updated via loading the processed updates to a hardware state (e.g., register file 50, via e.g. an indirect pointer) and a new snapshot may be saved in state buffer 48 without any appended updates. If the draw command is dead, the constant update(s) may be appended to state buffer 48 for processing at a potentially later time (e.g., without updating the constant values). In an example, if the draw command is determined to be live, but there have been no updates to constant values needed to process the draw command, command processor 52 of GPU 14 may not process constant updates (e.g., bypass the processing of the constant updates) and allow them to continue to accumulate in state buffer 48.

Because the updating of the constants is deferred, in the example where there is no live draw call that uses these lightweight constant values, command processor 52 of GPU 14 may never need to process the foregoing updates in state buffer 48 saving processing resources. These unprocessed updates may be discarded or overwritten.

Figure 2:
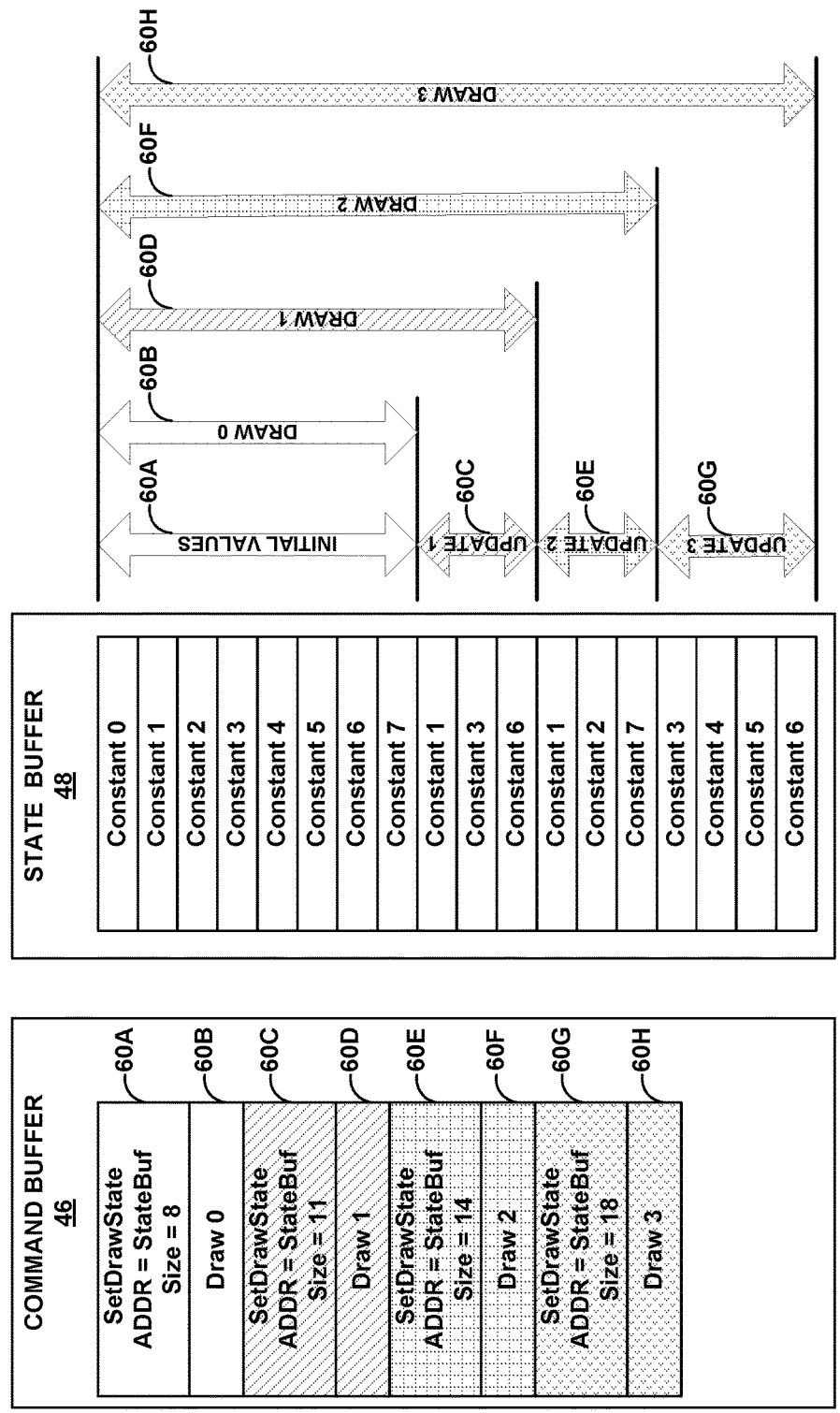
FIG. 2 is a conceptual diagram illustrating an exemplary operation of the command buffer 46 and state buffer 48 of FIG. 1, according to aspects of this disclosure.

FIG. 2 is a conceptual diagram illustrating an exemplary operation of the command buffer 46 and state buffer 48 of FIG. 1 in greater detail. In the example of FIG. 2, command buffer 46 may be populated with one or more commands 60A-60H (collectively "commands 60") to be executed on GPU 14. In a binning architecture, each bin (or tile) may process draw calls and constant updates independently.

GPU 14 (e.g., via command processor 52) may process the next command in command buffer 46, command 60A. Command 60A includes a deferred state load mechanism that, when processed, loads a snapshot of lightweight constant values from register file 50, including constants 0-7. The size field may include the number of constants (e.g., dwords) in the state buffer 48 and as shown is equal to eight. Further, command 60A includes an address of where the deferred state constants will be loaded. As shown in FIG. 2, this may be an address of state buffer 48. GPU 14 may then process the next command in command buffer 46, command 60B. Command 60B, when processed, is a draw command to render a graphical element. Command processor 52 of GPU 14 may determine whether the draw command is live (e.g. visible) or dead (e.g. not visible). GPU 14 may determine that there are no deferred constant updates to process.

In an example, state buffer 48 only includes lightweight constants. Other state information may be stored in other state buffers. In such an example, lightweight constants are not mixed with other state information in a single state buffer as it may complicate the append mechanism. Each of the entries in state buffer 48 labeled "Constant X" in FIG. 2 includes a hardware command to load that constant, an (address, data) pair. Command processor 52 executes these commands in order as it processes state buffer 48. In other examples, state information may be mixed one or more buffers.

GPU 14 may process to the next command in command buffer 46, command 60C. Command 60C includes a deferred state load mechanism that, when processed, increases the size of state buffer 48 to eleven (from eight as updated by command 60A). A pointer to (or address of) state buffer 48 remains unchanged. GPU 14 may then process the next command in command buffer 46, command 60D.

Command 60D, when processed, is a draw command to render a graphical element. GPU 14 may determine whether the draw command 60D is live (e.g. visible) or dead (e.g. not visible). If draw command 60D is live, GPU 14 may process the update commands by altering the values of the constant values in register file 50. In some examples, GPU 14 may reload a snapshot of the state of the lightweight constants. If the draw call is dead, GPU 14 may append updates to constants 1, 3 and 6 to state buffer 48.

GPU 14 may process the next command in command buffer 46, command 60E. Command 60E includes a deferred state load mechanism that, when processed, increases the size of state buffer 48 to fourteen (from eleven as updated by command 60C). A pointer to (or address of) state buffer 48 remains unchanged. GPU 14 may then process the next command in command buffer 46, command 60F. Command 60F, when processed, is a draw command to render a graphical element. GPU 14 may determine whether the draw command 60F is live (e.g. visible) or dead (e.g. not visible). If draw command 60F is live, GPU 14 may process the update command(s) by altering the values of the constant values in register file 50. In some examples, GPU 14 may reload a snapshot of the state of the lightweight constants. If the draw call is dead, GPU 14 may append updates to constants 1, 2 and 7 to state buffer 48.

GPU 14 may process the next command in command buffer 46, command 60G. Command 60G includes a deferred state load mechanism that, when processed, increases the size of state buffer 48 to eighteen (from fourteen as updated by command 60E). A pointer to (or address of) state buffer 48 remains unchanged. GPU 14 may then process the next command in command buffer 46, command 60H. Command 60H, when processed, is a draw command to render a graphical element. GPU 14 may determine whether the draw command 60H is live (e.g. visible) or dead (e.g. not visible). If draw command 60H is live, GPU 14 may process the update command(s) by altering the values of the constant values in register file 50. In some examples, GPU 14 may reload a snapshot of the state of the lightweight constants. If the draw call is dead, GPU 14 may append updates to constants 3, 4, 5, and 6 to state buffer 48.

As is shown in FIG. 2, upon reaching a live draw command, GPU 14 may perform batched constant updates. For example, if draw 1 (command 60D) and draw 2 (command 60F) are not live, each of the constants to be updated are stored in state buffer 48 and remain deferred. Then, if draw 3 (command 60H) is live, GPU 14 may be configured to process each update (e.g. updates 1-3) sequentially beginning with update 1 and stored, e.g., in register file 50 (e.g., loaded into a hardware state via an indirect pointer). Thus, in the example shown in FIG. 2, constants 1, 3, and 6 will be updated 2 separate times each. In other examples, multiple updates for a single constant are combined which allows the constant to be updated once. A clean snapshot of the lightweight constants may be retrieved from register file 50 into state buffer 48. If draw 3 (command 60H) is dead and is the final draw command for, e.g., the bin, all of the updates (e.g. updates 1-3) may be discarded without further processing.

In some examples, updates to constants are interspersed with both live and dead draw commands in the same bin. In such examples, deferred constant updates may be processed multiple times for the bin when a live draw command is encountered. In such examples, there may be deferred constant updates after the last live draw command is executed. This occurs, for example, where there are constant updates added to the constant buffer followed by one or more dead draw commands. Even in these examples, remaining deferred constant updates may not be processed and may be discarded.

Figure 3:
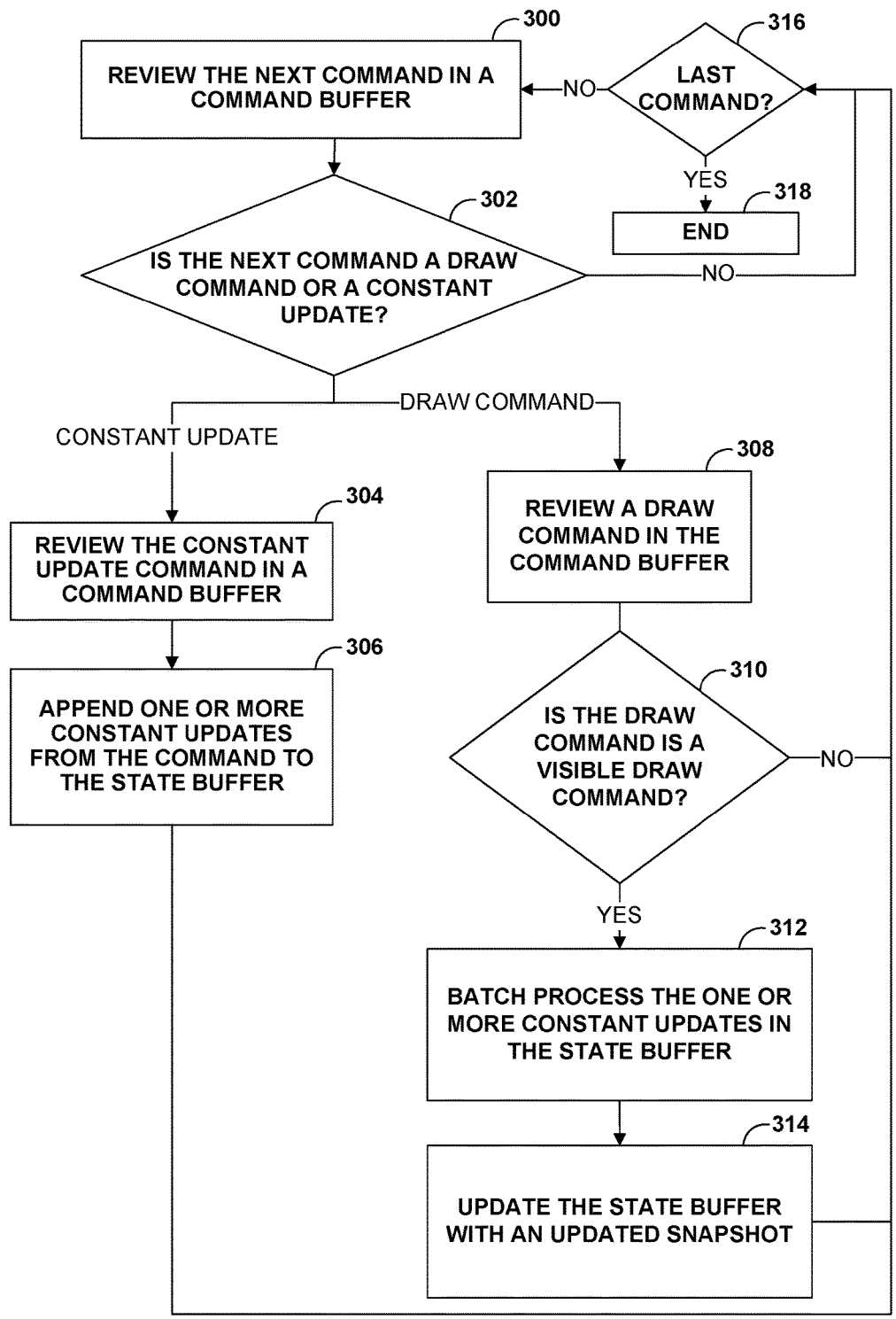
FIG. 3 is a flowchart illustrating an example method of deferred batching of constants according to aspects of the present disclosure.

FIG. 3 is a flowchart illustrating an example method of deferred batching of constants according to aspects of the present disclosure.

Command processor 52 of GPU 14 may process the next command in command buffer 46 (300). If the next command is an update to a lightweight constant value (302, constant update branch), command processor 52 of GPU 14 may review the update command in command buffer 46 (304). GPU 14 may append the one or more constant updates in the constant update command to the state buffer 48 (306). Command processor 52 of GPU 14 may determine whether the current command is the last command in command buffer 46 (e.g., for the current bin) (316) and continue.

If the next command is a draw command (302, draw command branch), command processor 52 may review the draw command in command buffer 46 (308). Command processor 52 of GPU 14 may determine whether the draw command is a visible (e.g., live) draw command. If the command is not a visible draw command (310, no branch), command processor 52 of GPU 14 may determine whether the current command is the last command in command buffer 46 (e.g., for the current bin) (316) and continue. If the command is a visible draw command (310, yes branch), command processor 52 of GPU 14 may batch process the one or more constant updates in state buffer 48 (312). The resulting updated values may be loaded to a hardware state (in e.g., register file 50) via, e.g., an indirect pointer. State buffer 48 may be updated with a new snapshot from register file 50 (314). Command processor 52 of GPU 14 may determine whether the current command is the last command in command buffer 46 (e.g., for the current bin) (316) and continue.

If the next command is neither a constant update or draw command (302, no branch), command processor 52 of GPU 14 may determine whether the current command is the last command in command buffer 46 (e.g., for the current bin) (316). If the command is not the last command (316, no branch), command processor 52 may review the next command in command buffer 46 (300). If the command is the last command (316, yes branch), the method ends (318). After the method ends (318), GPU 14 may process another bin in an image. Therefore, there may be examples where there were deferred updates appended to state buffer 48 (306) that were never batch processed (312) due to command processor 52 not encountering a live draw command. In such examples, GPU 14 may save processing time processing the appended and unprocessed constant updates.

Figure 4:
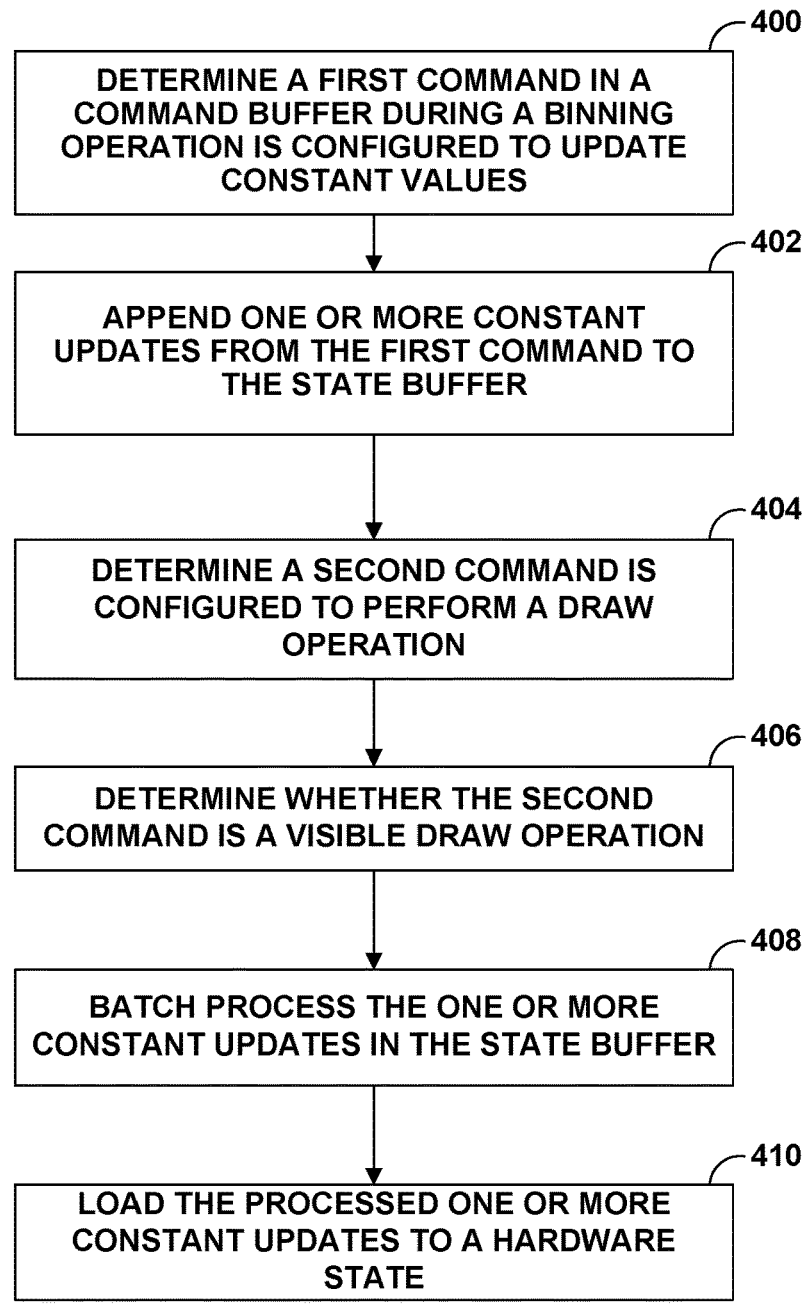
FIG. 4 is a flowchart illustrating an example method according to aspects of the present disclosure.

FIG. 4 is a flowchart illustrating an example method according to aspects of the present disclosure.

Command processor 52 of GPU 14 may be configured to determine a first command in command buffer 46 during a binning operation is configured to update constant values (400). The command may include instructions to update the value of a constant, e.g., a lightweight constant. Rather than performing the update immediately and update snapshot values in state buffer 48 or in register file 50, GPU 14 may append one or more of the constant updates from the first command to the state buffer 48 (402). Appending the constant updates may include increasing the size of the state buffer based on the number of constant values updated. This operation may enlarge the size of state buffer 48 by the commensurate number of updates.

Command processor 52 may determine a second command, in command buffer 46, is configured to perform a draw operation (404). GPU 14 may determine whether the draw command is a visible draw operation or is non-visible (406). If the draw command is visible, GPU 14 may batch process the one or more constant updates in state buffer 48 (408). The batch processing may be performed in the order added to the state buffer. GPU 14 may load the processed one or more constant updates to a hardware state (e.g., in register file 50) via an indirect pointer (410). If the draw command is not visible, GPU 14 may bypass (e.g., halt the processing of) the constant updates in state buffer 48. At the completion of processing the first bin (or tile) of the image, GPU 14 may discard appended but not batch-processed constant updates.

It should be understood that the techniques shown in FIGS. 3 and 4 are provided for purposes of illustration only. In other examples, the process may include more, fewer, or an alternative arrangement of steps than those show. For example, as described above, filtering operations may not be performed for all texture data.

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media or communication media including any medium that facilitates transfer of a computer program from one place to another. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices, cache memory, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" and "processing unit," as used herein may refer to any of the foregoing structure or any other structure suitable for implementation on of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (i.e., a chip set). Various components, modules or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various aspects of the disclosure have been described. These and other embodiments are within the scope of the following claims.

What is claimed is:

1. A method of operating a graphics processing unit (GPU), the method comprising:
   determining, during a binning operation, that a first command in a command buffer is configured to update one or more constant values in a state buffer, the state buffer comprising a copy of a current constant state;
   appending one or more constant updates from the first command to the state buffer based on the first command without updating the one or more constant values until a draw operation;
   determining that a second command in the command buffer is configured to perform the draw operation;
   determining whether the second command is a visible draw operation;
   when the second command is the visible draw operation, batch processing the one or more constant updates in the state buffer; and
   when the second command is not the visible draw operation, bypassing the processing of the one or more constant updates.

2. The method of claim 1, further comprising: when the second command is the visible draw operation, loading the processed one or more constant updates to a hardware state via an indirect pointer.

3. The method of claim 1, wherein processing the one or more constant updates comprises processing the one or more constant updates in the order appended to the state buffer.

4. The method of claim 1, further comprising:
   when the second command is not the visible draw operation, processing a next command in the command buffer without updating the one or more constant values.

5. The method of claim 1, further comprising increasing the size of the state buffer based on appending the one or more constant values.

6. The method of claim 1, wherein batch processing the one or more constant updates in the state buffer is based on the determination that the second command is the visible draw operation.

7. The method of claim 1, wherein the binning operation comprises the binning operation of a first tile in a plurality of tiles of an image to be rendered by the GPU.

8. The method of claim 7, further comprising:
   appending one or more constant updates from one or more third commands to the state buffer without updating the one or more constant values;

at the completion of the binning operation of the first tile in the plurality of tiles, discarding the appended one or more constant updates that have not been batch processed.

9. The method of claim 1, further comprising:
determining, prior to retrieving the second command and during the binning operation, that a third command in the command buffer is configured to update the one or more constant values in the state buffer;
bypass updating the one or more constant values; and
appending one or more constant updates from the third command to the state buffer based on the third command.

10. The method of claim 1, wherein batch processing comprises only when the second command is the visible draw operation, batch processing the one or more constant updates in the state buffer.

11. The method of claim 1, wherein the one or more constant values comprise constant values mapped directly to a hardware resource on the GPU.

12. An apparatus for processing data, the apparatus comprising:
a graphics processing unit (GPU), the GPU comprising a command buffer and a state buffer, and a command processor, wherein the command processor is configured to:
determine, during a binning operation, that a first command in the command buffer is configured to update one or more constant values in the state buffer, the state buffer comprising a copy of a current constant state;
append one or more constant updates from the first command to the state buffer based on the first command without updating the one or more constant values until a draw operation;
determine that a second command in the command buffer is configured to perform the draw operation;
determine whether the second command is a visible draw operation;
when the second command is the visible draw operation, batch process the one or more constant updates in the state buffer; and
when the second command is not the visible draw operation, bypass the processing of the one or more constant updates.

13. The apparatus of claim 12, wherein the command processor is further configured to, when the second command is the visible draw operation, load the processed one or more constant updates to a hardware state via an indirect pointer.

14. The apparatus of claim 12, wherein the command processor configured to process the one or more constant updates comprises the command processor configured to process the one or more constant updates in the order appended to the state buffer.

15. The apparatus of claim 12, wherein the command processor is further configured to, when the second command is not the visible draw operation, process a next command in the command buffer without an update of the one or more constant values.

16. The apparatus of claim 12 further comprising a central processing unit (CPU) comprising a GPU driver, the GPU driver configured to increase the size of the state buffer based on appending the one or more constant values.

17. The apparatus of claim 12, wherein batch processing the one or more constant updates in the state buffer is based on the determination that the second command is the visible draw operation.

18. The apparatus of claim 12, wherein the binning operation comprises the binning operation of a first tile in a plurality of tiles of an image to be rendered by the GPU.

19. The apparatus of claim 12, wherein the command processor is further configured to:
append one or more constant updates from one or more third commands to the state buffer without updating the one or more constant values;
at the completion of the binning operation of the first tile in the plurality of tiles, discard the appended one or more constant updates that have not been batch processed.

20. The apparatus of claim 12, wherein the command processor is further configured to,
determine, prior to retrieving the second command and during the binning operation, that a third command in the command buffer is configured to update the one or more constant values in the state buffer;
bypass the update of the one or more constant values; and
append one or more constant updates from the third command to the state buffer based on the third command.

21. The apparatus of claim 12, wherein the command processor configured to batch process comprises, only when the second command is the visible draw operation, batch process the one or more constant updates in the state buffer.

22. The apparatus of claim 12, wherein the one or more constant values comprise constant values mapped directly to a hardware resource on the GPU.

23. An apparatus configured to operate a graphic processing unit (GPU), the apparatus comprising:
means for determining, during a binning operation, that a first command in a command buffer is configured to update one or more constant values in a state buffer, the state buffer comprising a copy of a current constant state;
means for appending one or more constant updates from the first command to the state buffer based on the first command without updating the one or more constant values until a draw operation;
means for determining that a second command in the command buffer is configured to perform the draw operation;
means for determining whether the second command is a visible draw operation;
means for batch processing the one or more constant updates in the state buffer when the second command is the visible draw operation; and
means for bypassing the processing of the one or more constant updates when the second command is not the visible draw operation.

24. The apparatus of claim 23, further comprising: means for loading the processed one or more constant updates to a hardware state via an indirect pointer when the second command is the visible draw operation.

25. The apparatus of claim 23, further comprising: means for processing a next command in the command buffer without updating the one or more constant values when the second command is not the visible draw operation.

26. The apparatus of claim 23, wherein the means for batch processing the one or more constant updates in the state buffer is based on the determination that the second command is the visible draw operation.

27. The apparatus of claim 23, wherein the one or more constant values comprise constant values mapped directly to a hardware resource on the GPU.

28. A non-transitory computer-readable storage medium including instructions stored thereon that, when executed, cause at least one processor to:
- determine, during a binning operation, that a first command in the command buffer is configured to update one or more constant values in the state buffer, the state buffer comprising a copy of a current constant state;
- append one or more constant updates from the first command to the state buffer based on the first command without updating the one or more constant values until a draw operation; determine that a second command in the command buffer is configured to perform the draw operation;
- determine whether the second command is a visible draw operation;
- when the second command is the visible draw operation, batch process the one or more constant updates in the state buffer; and
- when the second command is not the visible draw operation, bypassing the processing of the one or more constant updates.

* * * * *